United States Patent [19]

Mildrum

[11] Patent Number: 4,687,629

[45] Date of Patent: Aug. 18, 1987

[54] FUEL ROD WITH ANNULAR NUCLEAR FUEL PELLETS HAVING SAME U-235 ENRICHMENT AND DIFFERENT ANNULUS SIZES FOR GRADUATED ENRICHMENT LOADING

[75] Inventor: Claude M. Mildrum, Monroeville Boro, Pa.

[73] Assignee: Westinghouse Electric Corp., Pittsburgh, Pa.

[21] Appl. No.: 822,724

[22] Filed: Jan. 27, 1986

[51] Int. Cl.$^4$ .............................................. G21C 3/30
[52] U.S. Cl. ..................................... 376/428; 376/455
[58] Field of Search ................................ 376/428, 455

[56] References Cited

U.S. PATENT DOCUMENTS

| | | | |
|---|---|---|---|
| 2,992,179 | 7/1961 | Bassett | 376/455 |
| 3,177,123 | 4/1965 | Huet | 376/455 |
| 4,372,911 | 2/1983 | Cachera | 376/455 |
| 4,393,510 | 7/1983 | Lang | 376/428 |

*Primary Examiner*—Donald P. Walsh

[57] ABSTRACT

A fuel rod for a nuclear reactor fuel assembly includes a cladding tube and a plurality of fuel pellets contained in the tube and composed of fissile material, such as uranium dioxide, having a single enrichment of U-235. At least some of the fuel pellets have an annular configuration. Some of the annular fuel pellets have an annulus of a first size, whereas other of the annular fuel pellets have an annulus of a second size different from the first size. In such manner, graduation of axial enrichment loading is provided between the annular fuel pellets of the fuel rod. Also, a nuclear fuel assembly includes a multiplicity of fuel rods with a plurality of fuel pellets contained in each of the fuel rods and being composed of fissile uranium having a single U-235 enrichment. Each of the fuel pellets in a majority of the fuel rods has a solid configuration, whereas each of the fuel pellets in a minority of the fuel rods has an annular configuration. Each of the annular fuel pellets of some of the fuel rods has an annulus of a first size. On the other hand, each of the annular fuel pellets of other of the fuel rods has an annulus of a second size, whereby graduation of enrichment loading is provided between the solid and annular fuel pellets of the respective majority and minority of fuel rods. The value of the single U-235 enrichment is at the level of the maximum enrichment loading of the fuel assembly.

4 Claims, 7 Drawing Figures

CORRESPONDENCE OF ENRICHMENT LOADING OF FUEL RODS

| % WT. OF U-235 (FIG. 5) | | % VOID (FIG. 6) | |
|---|---|---|---|
| (A) – 1.788 | ≈ | (A) | |
| (B) – 2.188 | ≈ | (⊗) | – 32.4 |
| (C) – 2.588 | ≈ | (◉) | – 20.0 |
| (D) – 2.888 | ≈ | (●) | – 10.8 |
| (E) – 3.236 | ≈ | (○) | – 00.0 |

FIG. 7

FUEL ROD WITH ANNULAR NUCLEAR FUEL PELLETS HAVING SAME U-235 ENRICHMENT AND DIFFERENT ANNULUS SIZES FOR GRADUATED ENRICHMENT LOADING

BACKGROUND OF THE INVENTION

1. Field of the Invention

The present invention relates generally to fuel assemblies for a nuclear reactor and, more particularly, is concerned with fuel rods in a fuel assembly containing annular nuclear fuel pellets having the same U-235 enrichment and different annulus sizes for graduated enrichment loading.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In nuclear reactors generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. Specifically, in a BWR the fuel assemblies are typically grouped in clusters of four with one control rod associated with each four assemblies. The control rod is insertable within the fuel assemblies for controlling the reactivity of the core. Each such cluster of four fuel assemblies surrounding a control rod is commonly referred to as a fuel cell of the reactor core.

A typical BWR fuel assembly in the cluster is ordinarily formed by a N by N array of the elongated fuel rods. The bundle of fuel rods are supported in laterally spaced-apart relation and encircled by an outer tubular channel having a generally rectangular cross-section. The outer flow channel extends along substantially the entire length of the fuel assembly and interconnects a top nozzle with a bottom nozzle. A hollow water cross extends axially through the outer channel so as to provide an open inner channel for subcooled moderator flow through the fuel assembly and to divide the fuel assembly into four, separate, elongated compartments, each containing a mini-bundle of similar design of the fuel rods. The bottom nozzle fits into the reactor core support plate and serves as an inlet for coolant flow into the outer channel of the fuel assembly. Coolant enters through the bottom nozzle and thereafter flows through the water cross and along the fuel rods removing energy from their heated surfaces.

Current BWR fuel rod bundle designs make use of solid pellet fuel rods having five to seven U-235 enrichments within a single bundle. These multiple enrichments are needed for radial power shaping within each bundle in order to maintain the fuel rod power peaking acceptably low. However, the requirement of multiple enrichments increases the cost and time required for fabrication. While only a small number of fuel rods in the assembly are involved, approximately one-third of the rods, they require four enrichments to be fabricated. Therefore, just to make these few rods, the UF$_6$ gas to powder chemical conversion line has to be flushed out four times which is both costly and time-consuming. Market considerations do not justify dedicating a conversion line for each enrichment. The only other alternative, e.g., creating the enrichments needed by blending two or three enrichments, is costly and time-consuming.

Consequently, a need exists for a fresh approach to fuel bundle design which will overcome the problems associated with the requirement for multiple fuel enrichment.

SUMMARY OF THE INVENTION

The present invention provides a fuel bundle composition for a fuel assembly which is designed to satisfy the aforementioned needs. The solution of the invention to the aforementioned problems created by the requirement of solid fuel pellet multiple enrichments is to replace all enrichment grades below the predominant enrichment with fuel rods containing annular fuel pellets. Annular fuel pellets per se are known in the prior art, as represented by U.S. Pat. Nos. (4,493,814), to Beard, Jr. et al (3,215,607), Lackey (4,273,616), Andrews (3,376,201), Bain (3,356,584), Ockert (3,808,099), Ballagny and (3,900,358) Bujas et al. However, none of the annular fuel pellets in the prior art fuel rods have the same enrichment (i.e., the predominant fuel enrichment of the fuel bundle) with preselected different annulus sizes to produce graduated enrichment loading of the fuel bundle. Such graduated enrichment loading by the annular fuel pellets of the invention is generally comparable to the U-235 loading previously provided by the solid fuel pellets multiple enrichments they are replacing but without the problems associated therewith. Thus, by the use of annular fuel pellets having the same enrichment and different annulus sizes, the need for multiple enrichments is eliminated. As a result, the fabrication cost and time required for powder conversion is reduced since only one enrichment is needed. The flushing out of the line after each change of enrichment is also eliminated.

Also, the use of annular pellets with graduated annulus sizes permits the fuel assembly design to be customized, if needed, for each utility and each cycle application. The use of multiple enrichments does not permit this customization because of prohibitive costs. Additionally, the use of different annulus sizes to permit one U-235 enrichment to be used for all fuel rods can be extended to the axial direction in single fuel rods. For example, since the core axial power distribution in BWRs is bottom-peaked, the fuel in the top half of the core is under-utilized. That is, for the uranium invested, less energy than desired is produced in the top half vs. bottom half of the core. Thus, it would be advantageous to place the graduated annular pellets of the invention in the top portion of each fuel rod. This increases the energy utilization of the fuel since the kw/kg of uranium is increased. The flattening of the core axial power shape produced by placing the annular pellet fuel in the top portion of each assembly improves the operating margins to the fuel thermal limits by reducing the axial power peaking and maximum hot spot power peaking. The use of annular pellets with graduated annulus sizes in the axial direction can be used as well to provide more shutdown margin in plants that are so limited. A BWR is most limited from a shutdown margin viewpoint at cold conditions. At these conditions, the core axial flux distribution is heavily top-skewed. One means of improving shutdown margin is to reduce the enriched fuel loading in the top third to half high flux and, therefore, high importance region of the core. For example, the average U-235 enrichment can be decreased by approximately 0.1 w/o U-235 in the top third of the core and increased by 0.05 w/o U-235 in the bottom two-thirds of the core to preserve the same overall core average U-235 loading. The decrease of the U-235 enrichment in the top third of the core could be realized by using annular pellets of larger annulus sizes than those in the bottom two-thirds. The net result would be a 0.5 to 1.0% delta-k improvement in shutdown margin with this design.

Another benefit of the use of annular pellets with graduated annulus sizes relates to the adverse effects of operating the fuel with control blades inserted adjacent to that fuel. In BWR reactors, a certain number of control rods must be inserted in the core to hold down the excess reactivity of the fuel which is installed to offset the loss of fuel reactivity with fuel depletion. The insertion of a control blade next to a BWR fuel assembly dramatically tilts the pin-wise power distribution within the bundle away from the control blade. That portion of the fuel closest to the control blade therefore does not deplete nearly as fast as the rest of the fuel in the bundle. The result is that, once the blade is withdrawn, the underdepleted fuel is too reactive and therefore produces too much power. This represents a substantial loss of available margin to the fuel operating limit on peaking factor and power density. The problem is further aggravated by the fact that the introduction of a control blade greatly shifts the neutron flux energy spectrum to higher energies. This has the consequence that more fissile plutonium is produced. Again, once the control blade is withdrawn, the higher fissile plutonium inventory in the fuel causes higher power production than desired and loss of operating margin to the fuel operating limits. To minimize these adverse effects of control blade insertion (commonly referred to as control rod history effects) on the power peaking of the fuel, the control blades must be regularly rotated to new positions throughout the cycle. Currently, these control blade rotations (commonly known as rod exchanges) must be done at substantially-reduced reactor power and the plant slowly returned to full power thereafter. This represents a very substantial loss of operating capacity factor for the plant.

The use of annular pellets with graduated annulus hole sizes markedly improve the above-described control blade condition. In the proposed design, the largest annulus size pellets are placed on the outermost rows of the assembly. It is precisely those fuel rods that are most affected by control blade insertion. By using annular pellets as opposed to solid pellets and by placing the largest annulus sizes in that region of the fuel assembly closest to the control blade, the fuel rods with the least amount of uranium loading are placed closest to the blade. Since these fuel rods have less uranium, there is less conversion to plutonium possible which reduces the power peaking experienced from the plutonium production. The reduced uranium loading of these fuel rods near the control blade also offsets the lower power production of these rods, due to the control blade presence. The result is that the depletion rate of the fuel measured in units of power produced per unit of uranium loaded is not reduced nearly as much for those rods adjacent to the control blade when annular pellets are used. This again helps to minimize any power peaking increase on those fuel rods once the control blade is withdrawn. Thus, the use of annular pellets with graduated annulus sizes helps to provide greater operating margin to the fuel thermal limits, to reduce the frequency of control blade rotations that are needed and, by so doing, improve the operating capacity factor of the plant.

Accordingly, the present invention is directed to a fuel rod for a nuclear reactor fuel assembly, which includes: (a) a cladding tube; and (b) a plurality of fuel pellets being contained in the tube and composed of fissile material having a single enrichment. At least some of the fuel pellets have an annular configuration, with certain ones of the annular fuel pellets having an annulus of a first size and others thereof having an annulus of a second size different from the first size. Such different annulus sizes of the annular fuel pellets allow graduation of axial enrichment loading of the fuel rod. The fissile material is uranium dioxide having a single U-235 enrichment.

Also, the present invention relates to a nuclear fuel assembly having a multiplicity of fuel rods, including: (a) a plurality of fuel pellets contained in each of the fuel rods and being composed of fissile material having a single enrichment; (b) each of the fuel pellets in a majority of the fuel rods having a solid configuration; and (c) each of the fuel pellets in a minority of the fuel rods having an annular configuration. Also, each of the annular fuel pellets of some of the fuel rods has an annulus of a first size. Each of the annular fuel pellets of other of the fuel rods has an annulus of a second size. The provision of the single enrichment in combination with different annulus sizes allows graduation of enrichment loading between the solid and annular fuel pellets of the respective majority and minority of fuel rods. The fissile material is uranium dioxide having a single U-235 enrichment, and the value of the single enrichment is at the level of the maximum enrichment loading of the fuel assembly.

These and other advantanges and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 7 is a comparison of the respective fuel bundles of FIGS. 5 and 6, which sets forth correspondence in enrichment loading of five different U-235 enrichments of solid fuel pellets in fuel rods of the prior art BWR fuel bundle of FIG. 5 with a single U-235 enrichment of both solid and annular fuel pellets in fuel rods of the BWR fuel bundle of FIG. 6 being fabricated in accordance with the present invention with the annular pellets having the different listed void or annulus sizes.

DETAILED DESCRIPTION OF THE INVENTION

Figure 1:
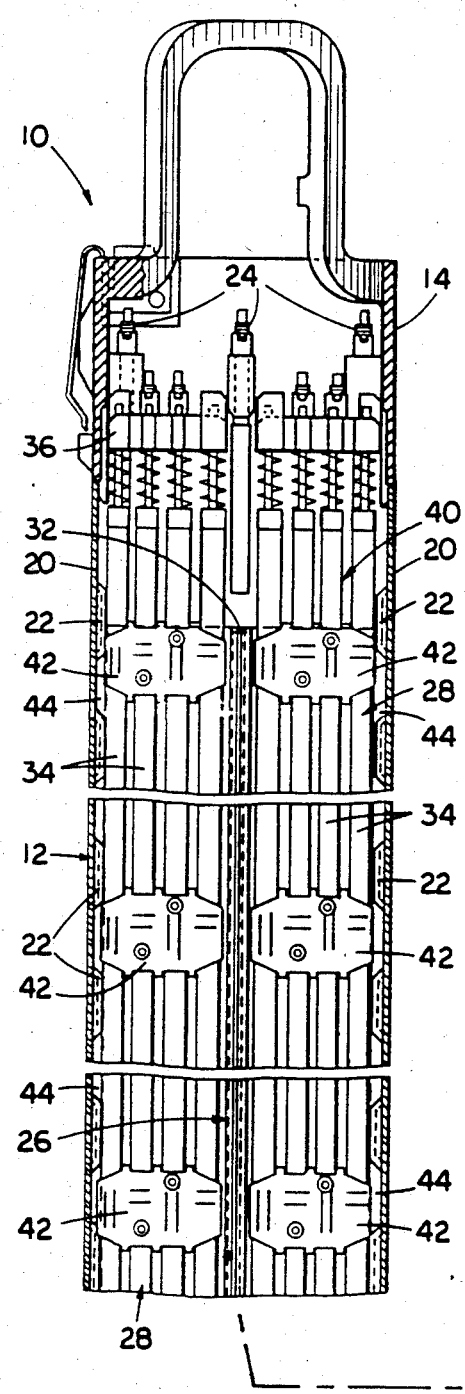
FIG. 1 is an elevational view, with parts broken away and sectioned for clarity, of a BWR nuclear fuel assembly in which the fuel bundle composition of the present invention is employed.
Figure 1:
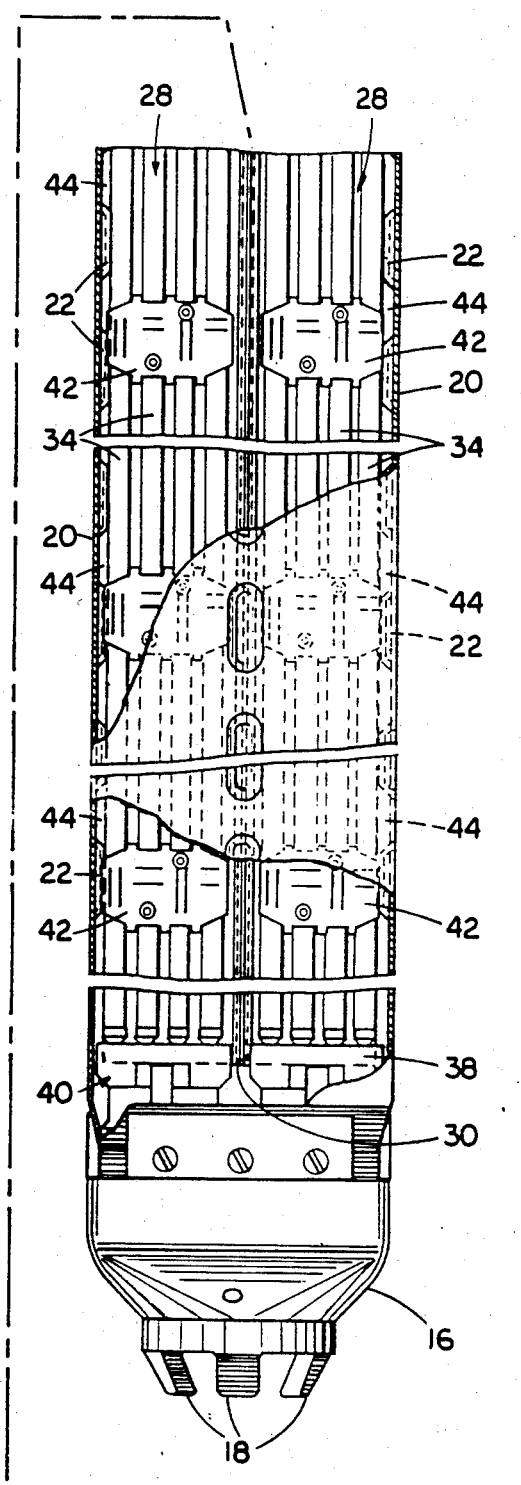

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

IN GENERAL

Referring now to the drawings, and particularly to FIG. 1, there is shown a nuclear fuel assembly, generally designated 10 for a boiling water nuclear power reactor (BWR), in which the improvement of the present invention is incorporated. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed from a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross 26 extends axially through the outer channel 12 so as to provide an open cruciform inner channel for subcooled moderator flow through the fuel assembly 10 and to divide the fuel assembly into four, separate, elongated compartments 28. The hollow water cross 26 is mounted to the angularly-displaced walls 20 of the outer channel 12. Preferably, the outer, elongated lateral ends of the water cross 26 are connected such as by welding to the structural ribs 22 along the lengths thereof in order to securely retain the water cross 26 in its desired central position within the fuel assembly 10. Also, the water cross 26 has a lower flow inlet end 30 and an opposite upper flow outlet end 32 which each communicate with the inner channel for providing subcoolant flow therethrough.

Disposed within the channel 12 is a bundle of fuel rods 34 which, in the illustrated embodiment, number sixty-four and form an $8\times8$ array. The fuel rod bundle is, in turn, separated into four mini-bundles thereof by the water cross 26. The fuel rods 34 of each mini-bundle, such being sixteen in number in a $4\times4$ array, extend in laterally spaced apart relationship between an upper tie plate 36 and a lower tie plate 38. The fuel rods in each mini-bundle are connected to the upper and lower tie plates 36,38 and together therewith comprise a separate fuel rod subassembly 40 within each of the compartments 28 of the channel 12. A plurality of grids or spacers 42 axially spaced along the fuel rods 34 of each fuel rod subassembly 40 maintain the fuel rods in their laterally spaced relationships. The upper and lower tie plates 36,38 of the respective fuel rod subassemblies 40 have flow openings defined therethrough for allowing the flow of the coolant fluid into and from the separate fuel rod subassemblies. Also, coolant flow paths provide flow communication between the fuel rod subassemblies 40 in the respective separate compartments 28 of the fuel assembly 10 through a plurality of openings 44 formed between each of the structural ribs 22 along the lengths thereof. Coolant flow through the openings 44 serves to equalize the hydraulic pressure between the four separate compartments 28, thereby minimizing the possibility of thermal hydrodynamic instability between the separate fuel rod subassemblies 40.

FUEL RODS HAVING ANNULAR FUEL PELLETS WITH SINGLE ENRICHMENT AND DIFFERENT ANNULUS SIZES

Figure 2:
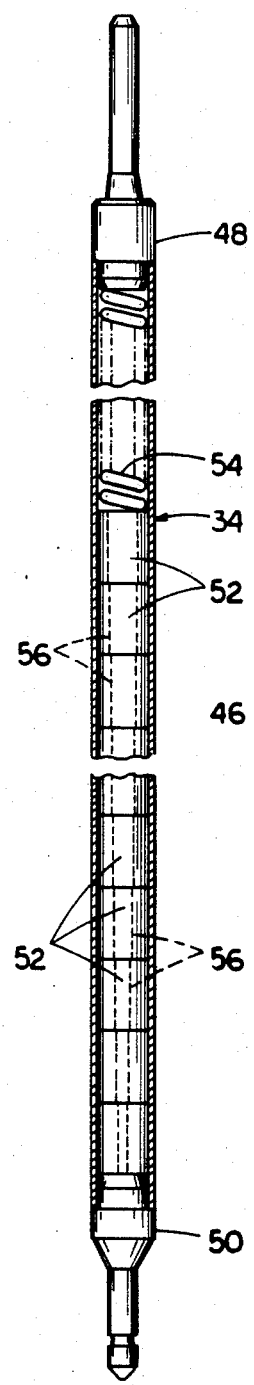
FIG. 2 is an enlarged elevational view, with portions broken away and sectioned for clarity, of one of the nuclear fuel rods of the fuel assembly of FIG. 1, being removed from the assembly and illustrated in foreshortened form.
Figure 3:
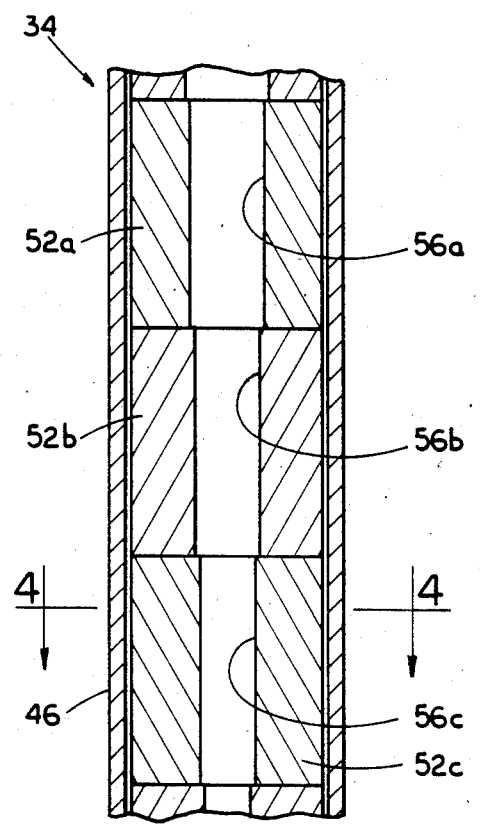
FIG. 3 is an enlarged fragmentary longitudinal detailed sectional view of the fuel rod of FIG. 2, illustrating several of the annular nuclear fuel pellets contained in the rod fabricated in accordance with the present invention to have a single U-235 enrichment and different annulus sizes to give the desired U-235 loading thereof.
Figure 4:
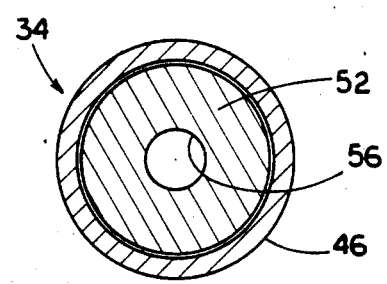
FIG. 4 is a sectional view of the fuel rod taken along line 4—4 of FIG. 3.

Turning now to FIGS. 2 through 4, there is shown one of the fuel rods 34 useful in the BWR fuel assembly of FIG. 1 which has been fabricated in accordance with the present invention. The fuel rod 34 includes a hollow cladding tube 46 being sealed at its opposite ends by upper and lower end plugs 48,50 and a plurality of fuel pellets 52 contained in the tube and retained in a stack form therein by a plenum spring 54 being disposed between the upper end plug 48 and the stack of pellets.

The pellets 52 are composed of fissile material, such as uranium dioxide, having a single enrichment of U-235, and, in addition, each fuel pellet 52 has an annular configuration. As clearly illustrated in FIG. 3, the central void or annulus 56 of any one of the annular fuel pellets 52 can be of a different diametric size than that of the others in order to vary the enrichment loading from pellet to pellet. For example, in FIG. 3 each annulus 56a–c of each respective pellet 52a–c is of a different size. In such manner, graduation of enrichment loading can be provided between the stacked annular fuel pellets 52 in the axial direction along the fuel rod 34. Such fuel rod configuration is particularly useful in BWR fuel assemblies. Since the core axial power distribution in BWRs is bottom-peaked, the fuel in the top half of the core is under-utilized. Thus, it would be advantageous to place the annular pellets in the top portion of each fuel rod. This increases the energy utilization of the fuel since the kw/kg of uranium is increased. The flattening of the core axial power shape produced by placing the annular pellet fuel in the top portion of each assembly improves the operating margins to the fuel thermal limits by reducing the axial power peaking and maximum hot spot power peaking.

Figure 5:
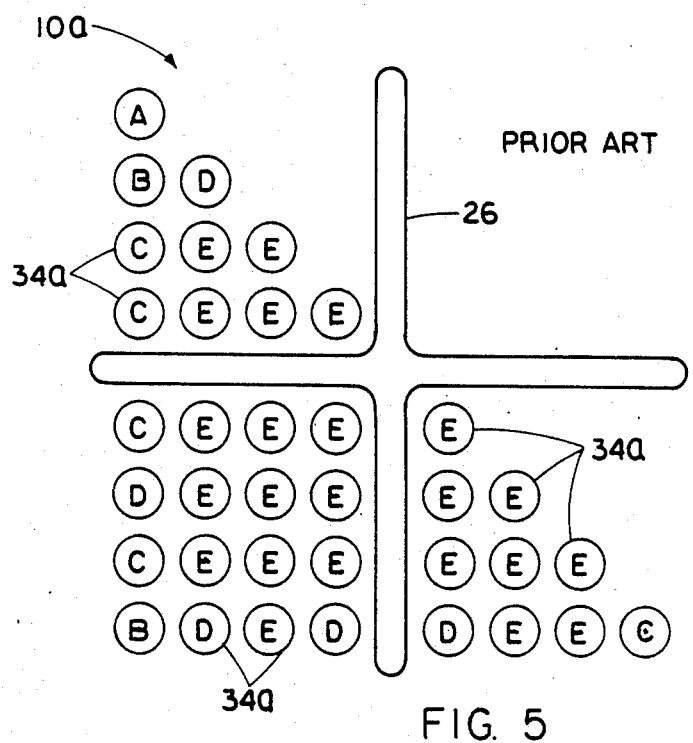
FIG. 5 is a typical prior art BWR fuel bundle composed of fuel rods containing solid fuel pellets having five different U-235 enrichments.
Figure 6:
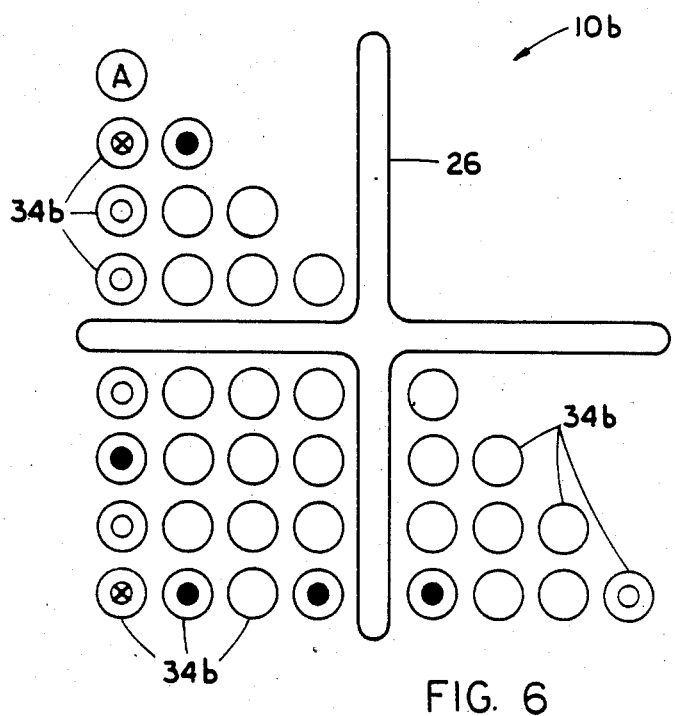
FIG. 6 is a BWR fuel bundle composed of fuel rods containing solid pellets and annular fuel pellets fabricated in accordance with the present invention to have a single U-235 enrichment with some annular pellets having different void or annulus sizes to give the desired graduated U-235 loading between the fuel rods composing the fuel bundle.

Referring now to FIGS. 5 through 7, a comparison can be made between the fuel bundle of a prior art BWR fuel assembly 10a, being partially represented schematically in FIG. 5, and the fuel bundle of a BWR fuel assembly 10b fabricated in accordance with the present invention, being partially represented schematically in FIG. 6. The fuel bundle of the prior art fuel assembly 10a includes fuel rods 34a which each contain fuel pellets that all have a solid configuration. To obtain the desired enrichment loading across the fuel assembly 10a, there are five different enrichments used in the solid fuel pellets of the prior fuel rods 34a. These fuel rods 34a which have the different enrichments are identified by letters A-E within respective circles and the values of the respective enrichments are listed in FIG. 7.

In contrast to the prior fuel assembly 10a of FIG. 5, the fuel bundle of the BWR fuel assembly 10b of the present invention in FIG. 6 includes fuel rods 34b which each contain fuel pellets composed of fissile uranium having a single U-235 enrichment. The single enrichment chosen for the fuel rods 34b in FIG. 6 is the predominant enrichment of the fuel rods 34a of FIG. 5, that being 3.236 w/o U-235. All of the fuel rods 34b in FIG. 6 having a uranium loading intended to match the loading of the predominant enrichment of the fuel rods 34a in FIG. 6 contain solid fuel pellets, as symbolized by an empty circle in FIGS. 6 and 7. All of the other fuel rods 34b, with the exception of one, contain annular fuel pellets. There are three categories of pellets with different respective void sizes, being specified in FIG. 7 and symbolized by respective circles containing a dot, s smaller circle and an "x" in a smaller circle in FIGS. 6 and 7. The one exception is the fuel rod symbolized by the circle containing the letter A. This rod has not been replaced with one containing annular pellets because the void percent or fraction would be excessive at approximately forty-five percent. Instead, a PWR enrichment could be used, such as a standard 2.6 w/o U-235 which would result in an approximately thirty-one percent void fraction which is a practical annulus size.

Therefore, with the exception of one, all solid pellet-containing fuel rods 34a in fuel assembly 10a having enrichments below the predominant enrichment are replaced by annular pellet-containing fuel rods 34b having a single enrichment and different annular or void percent sizes. In such manner, the desired uranium loading of the annular pellet-containing fuel rods can be provided by properly sizing the annulus of their pellets.

In the illustrated example, as explained in FIG. 7, the predominant enrichment is 3.236 w/o U-235. In the complete prior art BWR fuel assembly 10a of FIG. 5, there are forty-one such fuel rods. These remain as solid pellet-containing fuel rods in the new fuel assembly 10b of FIG. 6. Thus, in view that there are sixty-four fuel rods 34b in the assembly 10b, a majority of them will contain fuel pellets having a solid configuration. Consequently, the remainder of the fuel pellets 34b, a minority of the total number of fuel rods, have an annular configuration. As seen in FIG. 7, there are three different void or annulus sizes, which provides the desired graduation of enrichment loading between the solid and annular fuel pellets of the respective majority and minority of fuel rods. The value of the single U-235 enrichment is at the level of the maximum or predominant enrichment loading of the prior art fuel assembly 10a of FIG. 5.

Consistent PHOENIX 2-D lattice calculations were made comparing the solid pellet fuel (FIG. 5) and annular pellet fuel (FIG. 6) designs from a neutronics behavior standpoint. Comparisons were made for radial pin-wise power distribution within the bundle, bundle reactivity, reactivity coefficients and defects. The results of these calculations indicated the following: (a) very comparable radial pin-wise power distributions; (b) a void coefficient benefit for the annular pellet design; (c) a shutdown margin benefit for the annular pellet design; and (d) essentially identical Doppler coefficient and defect. In sum, the neutronics behavior of the annular pellet design is expected to be acceptable in all areas. It also has comparable fuel cycle cost to the solid pellet design.

While the present invention has been described with reference to fuel rods for a BWR fuel assembly, it is equally applicable to fuel rods intended for use in other types of nuclear reactors.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A fuel rod for a nuclear reactor fuel assembly, comprising:
   (a) a hollow cladding tube;
   (b) a pair of end plugs connected to and sealing said cladding tube at opposite ends thereof;
   (c) a plurality of fuel pellets contained in said tube and being composed of fissile material having a single enrichment the value of which is at the level of the maximum enrichment loading of said rod, said pellets being provided in a stack having one end disposed adjacent to one of said end plugs and an opposite end disposed remote from the other of said end plugs; and
   (d) a plenum spring disposed in said tube between said other end plug and said opposite end of said pellet stack for retaining said pellets in a stack form;
   (e) at least some of said fuel pellets having an annular configuration and at least other of said fuel pellets having a solid configuration;
   (f) each of some of said annular fuel pellets having an annulus of a first size;
   (g) each of other of said annular fuel pellets having an annulus of a second size different from said first size, whereby graduation of axial enrichment loading is provided between said annular fuel pellets of said fuel rod.

2. The fuel rod as recited in claim 1, wherein said fissile material is uranium dioxide having a single U-235 enrichment.

3. In a nuclear fuel assembly including a multiplicity of fuel rods, the combination comprising:
   (a) a plurality of fuel pellets contained in each of said fuel rods and being composed of fissile material having a single enrichment the value of which is at the level of the maximum enrichment loading of said fuel assembly;

(b) each of said fuel pellets in a majority of said fuel rods having a solid configuration; and (c) each of said fuel pellets in a minority of said fuel rods having an annular configuration, each of said annular fuel pellets of some of said fuel rods having an annulus of a first size, each of said annular fuel pellets of other of said fuel rods having an annulus of a second size different from said first size, whereby graduation of enrichment loading is provided in said fuel assembly between said solid and annular fuel pellets of said respective majority and minority of fuel rods thereof.

4. The fuel rod as recited in claim 3, wherein said fissile material is uranium dioxide having a single U-235 enrichment.

* * * * *